(12) United States Patent
Buil et al.

(10) Patent No.: US 12,211,137 B2
(45) Date of Patent: Jan. 28, 2025

(54) DISPLAYING A THREE DIMENSIONAL VOLUME

(71) Applicant: KONINKLIJKE PHILIPS N.V., Eindhoven (NL)

(72) Inventors: Vincentius Paulus Buil, Veldhoven (NL); Hugo Habets, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/768,491

(22) PCT Filed: Oct. 6, 2020

(86) PCT No.: PCT/EP2020/078014
§ 371 (c)(1),
(2) Date: Apr. 13, 2022

(87) PCT Pub. No.: WO2021/073958
PCT Pub. Date: Apr. 22, 2021

(65) Prior Publication Data
US 2024/0104827 A1  Mar. 28, 2024

(30) Foreign Application Priority Data
Oct. 14, 2019 (EP) .................................... 19203037

(51) Int. Cl.
*G06T 15/00* (2011.01)
*G06T 15/06* (2011.01)
*G06T 15/08* (2011.01)

(52) U.S. Cl.
CPC .............. *G06T 15/08* (2013.01); *G06T 15/06* (2013.01); *G06T 2210/41* (2013.01)

(58) Field of Classification Search
CPC ......... G06T 19/00; G06T 17/20; G06T 17/00; G06T 15/10; G06T 15/00; G06T 13/40;
(Continued)

(56) References Cited

U.S. PATENT DOCUMENTS 9,934,602 B2  4/2018 O'Leary
2005/0018888 A1  1/2005 Zonneveld
(Continued)

OTHER PUBLICATIONS

PCT International Search Report, International application No. PCT/EP2020/078014, Dec. 11, 2020.
(Continued)

*Primary Examiner* — Gordon G Liu
(74) *Attorney, Agent, or Firm* — Sherry Austin

(57) ABSTRACT

A method 100 of displaying a three dimensional volume of an image on a two dimensional display. For each pixel in the two dimensional display, the method comprises sequentially stepping 102 through a plurality of points along a line of sight from the pixel into the three dimensional volume and determining 104 a first point along the line of sight at which the three dimensional volume has a value that satisfies a first criteria indicating that the first point comprises a surface of interest in the three dimensional image. From the first point, the method then comprises determining 106 a second point that lies normal to the surface of interest at the first point, and determining 108 a value for the pixel based on a first value associated with the second point.

20 Claims, 6 Drawing Sheets

(58) Field of Classification Search
CPC ......... G06T 15/06; G06T 15/08; G06T 15/20;
G06T 15/04; G06T 2210/41; G06T
19/006; G06T 7/337; G06T 7/50; G06T
7/74; G06T 19/20; G06T 2200/04; G06T
2207/10016; G06T 2207/30244; G06T
2219/024; G06T 2219/2016; G06F 16/51;
G06F 21/602; H04N 23/64; H04N 23/90;
G06V 20/20
USPC .......................................................... 345/419
See application file for complete search history.

(56) References Cited

U.S. PATENT DOCUMENTS

| | | |
|---|---|---|
| 2005/0286748 A1 | 12/2005 | Yang |
| 2010/0134491 A1 | 6/2010 | Borland |
| 2011/0090222 A1* | 4/2011 | Ibarz ........................ G06T 17/20 |
| | | 345/422 |
| 2011/0169830 A1* | 7/2011 | D'Amora ................. G06T 15/08 |
| | | 345/424 |
| 2011/0172531 A1 | 7/2011 | Kanayama |
| 2012/0306849 A1* | 12/2012 | Steen ................... G06F 3/04812 |
| | | 345/419 |
| 2013/0002673 A1 | 1/2013 | Xue |
| 2018/0108169 A1 | 4/2018 | Miller |

OTHER PUBLICATIONS

Carr J. et al., "Surface Reconstruction in 3D Medical Imaging", Thesis, Institut Fur Fernmeldetechnie, Technische Universitat Berlin, Feb. 1, 1996 (Feb. 1, 1996), pp. 1-207, XP009144127, Chapter 3 "Visualisation of Surfaces from Volumetric Data"; p. 35-p. 65.

Stytz M. R. et al., "Three-Dimensional Medical Imaging", ACM Computing Surveys, ACM, NY, NY, US, vol. 23, No. 4, Dec. 1, 1991 (Dec. 1, 1991), pp. 421-499, XP058297831.

* cited by examiner

DISPLAYING A THREE DIMENSIONAL VOLUME

CROSS-REFERENCE TO RELATED APPLICATIONS

This patent application claims the priority benefit under 35 U.S.C. § 371 of International Patent Application no. PCT/EP2020/78014, filed Oct. 6, 2020, which claims the benefit of European Patent Application No. EP19203037.7, filed on Oct. 14, 2019. These applications are hereby incorporated by reference herein in their entirety.

FIELD OF THE INVENTION

Embodiments herein relate to imaging and displaying images. Particularly but non-exclusively, embodiments herein relate to displaying a three dimensional volume of an image onto a two dimensional display.

BACKGROUND OF THE INVENTION

This disclosure lies in the area of rendering three dimensional volumetric datasets on two dimensional displays. The disclosure is relevant to technologies such as those found in video monitors or head mounted displays (virtual or mixed reality displays). It is also relevant to the rendering of three dimensional image volumes, such as those obtained in three dimensional medical imaging, onto two dimensional displays such as screens or display monitors.

When rendering a three dimensional volume onto a two dimensional display (or surface), a common technique used is ray-marching. Ray-marching is a technique used to represent a three-dimensional image volume on a two dimensional display such as a two dimensional screen. For each pixel in the two dimensional display, a line of sight (or "ray") is cast, from the pixel into the volume. The values or colors of voxels along the ray are sampled and taken into consideration when determining a value or color for the associated pixel in the two dimensional display. Sampling may involve, for example, determining an average, maximum or minimum value/color for the voxels along the ray and using the determined average, maximum or minimum value/color for the pixel in the two dimensional display. This is known as compositing.

In many applications, the two dimensional display may not align with (e.g. may be at an angle to) an edge of the three dimensional volume being displayed. As such, the rays cast from the two dimensional display may enter the three dimensional volume at an angle and interpolation may be required in order to sample the three dimensional volume at equidistant points along each ray. This may make ray-marching computationally expensive.

It is an object of embodiments herein to improve on such methods.

SUMMARY OF THE INVENTION

As described above, projecting (or rendering) a three dimensional volume onto a two dimensional display involves, for each pixel in the two dimensional display, casting a line of sight from the pixel into the volume. To determine an appropriate value or color for the pixel, the voxels along the associated line of sight may be composited (e.g. a mathematical operation such as an average or min/max may be performed.) Furthermore interpolation between voxels may need to be performed if the line of sight enters the volume at an angle. These mathematical operations are computationally expensive. Furthermore, in some applications, the three-dimensional volume may be moved or moving in real-time (c.f. virtual reality displays, or the rotation of a three dimensional medical image) such that the computations need to be continuously updated. It is therefore desirable to develop systems and methods for rendering a three dimensional volume onto a two dimensional display in a computationally efficient manner.

One known method of rendering a surface using ray-marching (as described above) comprises rendering the points in the three dimensional volume that rise above a threshold. This is more computationally efficient as the line of sight from each pixel in the two dimensional display into the three dimensional volume is processed only until a voxel/point is reached with a particular value/color. This value is then used as the value for the corresponding pixel in the two dimensional display. The downside of such a method however is that a surface of constant value/color may result in a monochrome outline when rendered on the two dimensional display. This may be an issue, for example, in medical images whereby the surface of an anatomical structure may comprise tissue of constant density that may thus appear monochrome in the two dimensional rendering of the three dimensional volume.

It is an object of some embodiments herein to improve upon this situation, whilst still providing a computationally efficient method of rendering a three dimensional volume onto a two dimensional display.

Thus, according to a first aspect, there is a method of displaying a three dimensional volume of an image on a two dimensional display. For each pixel in the two dimensional display, the method comprises: sequentially stepping through a plurality of points along a line of sight from the pixel into the three dimensional volume, determining a first point along the line of sight at which the three dimensional volume has a value that satisfies a first criteria indicating that the first point comprises a surface of interest in the three dimensional image, from the first point, determining a second point that lies normal to the surface of interest at the first point, and, determining a value for the pixel based on a first value associated with the second point.

Thus according to this method, voxels along each line of sight corresponding to a surface of interest (e.g. such as a boundary) are searched for, however the value/color rendered for the corresponding line of sight depends on the value of a point normal to this surface. In this way instead of rendering points corresponding to the threshold value onto the two dimensional surface, a surface that lies (e.g. fractionally) inside or outside the surface of interest/boundary is rendered. This may produce subtle color differences that reflect the nature of a structure neighboring the surface of interest, whilst still essentially rendering the surface itself. This produces a 2D rendering of a 3D object that contains more information than if the monochrome surface of interest were displayed, but which saves considerable computing power compared to ray-marching and compositing values through the full volume.

According to a second aspect there is a method of displaying a three dimensional volume of an image on a two dimensional display, wherein for each pixel in the two dimensional display, the method comprises: sequentially stepping through a plurality of points along a line of sight from the pixel into the three dimensional volume; determining a first point along the line of sight at which the three dimensional volume has a value that satisfies a first criteria indicating that the first point lies on a surface of interest in the three dimensional image; from the first point, determining a second point that lies at a predefined distance in a direction normal to the surface of interest at the first point wherein the predefined distance comprises a distance less than a voxel width in the three dimensional volume; and determining a value for the pixel based on a first value associated with the second point.

According to a third aspect there is a system for displaying a three dimensional volume of an image on a two dimensional display. The system comprises a memory comprising instruction data representing a set of instructions, and a processor configured to communicate with the memory and to execute the set of instructions. The set of instructions, when executed by the processor, cause the processor to, for each pixel in the two dimensional display: sequentially step through a plurality of points along a line of sight from the pixel into the three dimensional volume; determine a first point along the line of sight at which the three dimensional volume has a value that satisfies a first criteria indicating that the first point comprises a surface of interest in the three dimensional image; from the first point, determine a second point that lies normal to the surface of interest at the first point; and determine a value for the pixel based on a first value associated with the second point.

According to a fourth aspect there is a system for displaying a three dimensional volume of an image on a two dimensional display. The system comprises: a memory comprising instruction data representing a set of instructions; and a processor configured to communicate with the memory and to execute the set of instructions, wherein the set of instructions, when executed by the processor, cause the processor to, for each pixel in the two dimensional display: sequentially step through a plurality of points along a line of sight from the pixel into the three dimensional volume; determine a first point along the line of sight at which the three dimensional volume has a value that satisfies a first criteria indicating that the first point lies on a surface of interest in the three dimensional image. The processor is further caused to, from the first point, determine a second point that lies at a predefined distance in a direction normal to the surface of interest at the first point wherein the predefined distance comprises a distance less than a voxel width in the three dimensional volume; and determine a value for the pixel based on a first value associated with the second point.

According to a fifth aspect there is a computer program product comprising computer readable medium comprising a computer readable medium, the computer readable medium having computer readable code embodied therein, the computer readable code being configured such that, on execution by a suitable computer or processor, the computer or processor is caused to perform the method of the first aspect.

BRIEF DESCRIPTION OF THE DRAWINGS

For a better understanding and to show more clearly how embodiments herein may be carried into effect, reference will now be made, by way of example only, to the accompanying drawings, in which.

DETAILED DESCRIPTION OF EMBODIMENTS

As described above, it can be very computationally expensive to render a three dimensional volume onto a two dimensional display. One method of rendering a surface in a three dimensional volume comprises casting a line of right (or a "ray") from the pixel into the three dimensional volume and determining the color of the pixel based on whether there is a voxel along the line of sight with a value (or color) above a threshold. Once a voxel or position along the line of sight (e.g. determined by interpolation) with the threshold value is found, no further processing is required along the line of sight and thus this provides a quick way to render a surface in the three dimensional volume on the two dimensional display. The disadvantage of such a method is that, by virtue of searching for the surface by means of finding voxels/positions having a threshold value, the voxels/positions found on the surface, have the same color/values and thus the surface is rendered in monochrome, effectively producing nothing more than a constant block of color. It is an object of embodiments herein to provide improved, computationally efficient methods of rendering a three dimensional volume on a two dimensional display.

Figure 1:
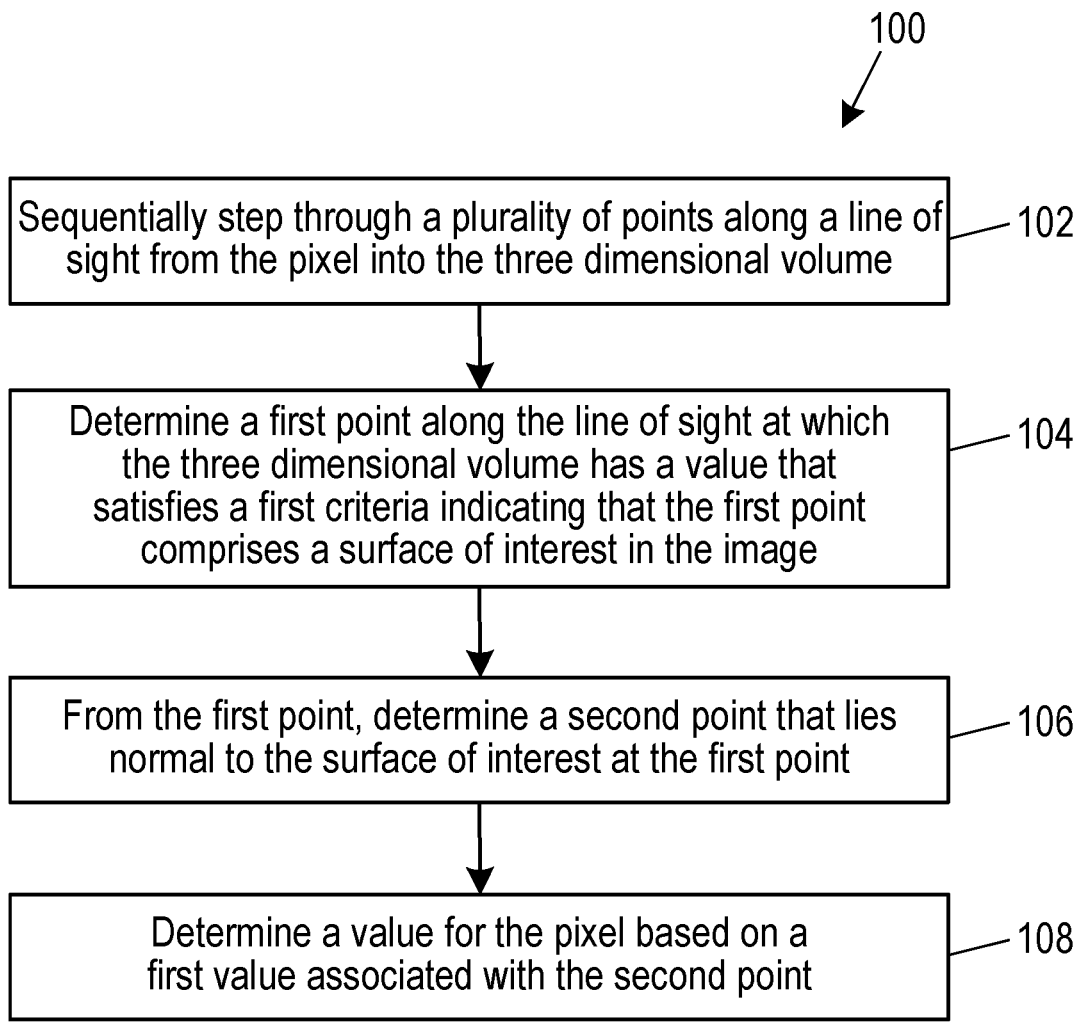
FIG. 1 shows a method according to some embodiments herein.

FIG. 1 illustrates a method 100 of displaying a three dimensional volume of an image on a two dimensional display according to some embodiments herein. For each pixel in the two dimensional display, the method comprises the following blocks. In a first block 102, the method 100 comprises sequentially stepping through a plurality of points along a line of sight from the pixel into the three dimensional volume. In a second block 104, the method comprises determining a first point along the line of sight at which the three dimensional volume has a value that satisfies a first criteria indicating that the first point comprises (e.g. is comprised in, lies on, or forms part of a) a surface of interest in the three dimensional image. In a third block 106, the method comprises, from the first point, determining a second point that lies normal to the surface of interest at (e.g. from) the first point and in a fourth block the method 108 comprises determining a value for the pixel based on a first value associated with the second point.

Figure 2:
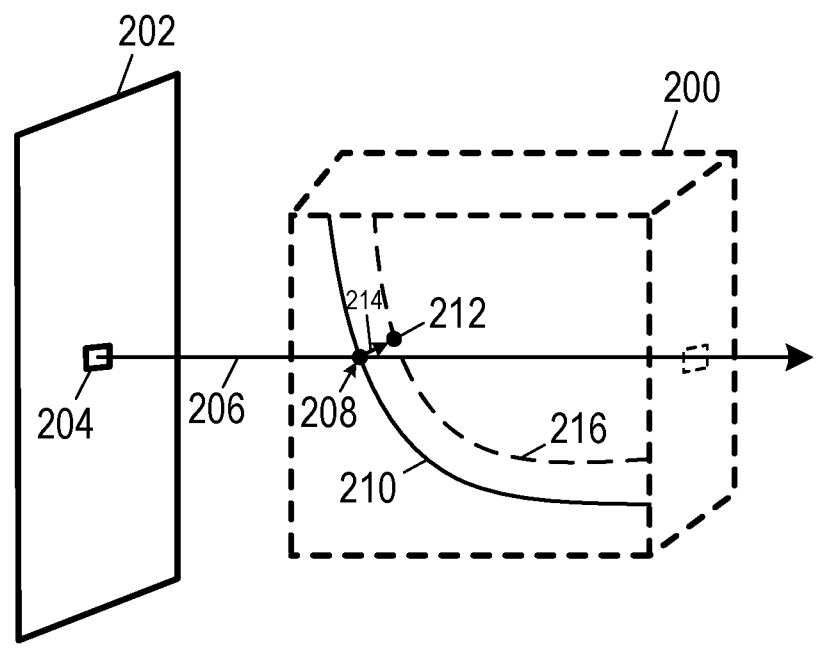
FIG. 2 illustrates a method according to some embodiments herein.

The principle behind the method 100 is illustrated in FIG. 2 which shows a three dimensional volume of an image 200 that is to be projected onto a two dimensional display 202. The three dimensional volume contains a surface of interest 210 captured in the image volume 200. For each pixel 204 in the two dimensional display 202, a line of sight 206 is cast into the three dimensional volume 200. A plurality of points along the line of sight 206 are assessed (sequentially) against a criteria until a first point 208 is found that satisfies a criteria, indicating that the first point 208 lies on, or forms part of, the surface of interest 210.

If the criteria is that the first point is to have a particular value (or color) and this value were used as the value for the pixel 204 in the two dimensional image 200, then repeating this for all pixels in the two dimensional image 202 would result in a monochrome block, the shape of which traced the outline of the surface 210 (effectively a basic projection of the surface of interest would be shown on the two dimensional display 202, in the same manner as a shadow).

In embodiments of this disclosure, what is suggested is that from the first point 208, a normal vector 214 is determined that lies normal to the surface of interest 210 at the first point 208. A second point 212 is determined in the direction of the normal vector and it is the value (or color) associated with the second point that is used to determine the value (or color) of the pixel 204.

When this is repeated for all pixels in the display 202, this has the effect of essentially rendering a surface 216 that is fractionally removed from (but traces), e.g. by a predefined distance, the surface of interest 210. When this surface is rendered in two dimensions, subtle color differences are introduced that reflect the characteristics of the image (e.g. the object in the image) just above or below, e.g. neighboring, the surface of interest. Note that "neighboring" in this sense could be on either side of the surface of interest, depending on the orientation of the normal vector.

In an example embodiment where the three dimensional image 200 comprises a medical image and the surface of interest 208 comprises a boundary or surface of an anatomical feature in the medical image, rendering the surface 216 may have the effect of providing an indication of the tissue characteristics just below (e.g. within the anatomical feature) the surface or alternatively, just outside the surface (depending on the direction that the normal vector is defined in).

This method may therefore provide a two dimensional rendering of a three dimensional object that contains more information than just displaying a monochrome surface of interest, but which may save considerable computing power compared to ray-marching and compositing values through the full volume (e.g. compared to considering or compositing voxels along the full line of sight 206 through the volume in order to determine an appropriate value for the pixel 204).

Turning back to the method 100, in more detail, the three dimensional volume of the image (otherwise referred to herein as the three dimensional image volume) may comprise any type of three dimensional image. In some examples herein, the three dimensional image volume may comprise a three dimensional medical image.

In more detail, a medical image may comprise an image acquired using any imaging modality. Examples of a medical image include, but are not limited to, a computed tomography (CT) image (for example, from a CT scan) such as a C-arm CT image, a spectral CT image or a phase contrast CT Image, an x-ray image (for example, from an x-ray scan), a magnetic resonance (MR) image (for example, from an MR scan), an ultrasound (US) image (for example, from an ultrasound scan), fluoroscopy images, nuclear medicine images, or any other three dimensional medical image.

In embodiments where the three dimensional image volume comprises a medical image, the surface of interest may comprise a surface associated with an anatomical feature, such as a surface associated with a heart, lung, blood vessel or artery, a bone, or any other anatomical feature or portion of an anatomic feature therewith. Such a surface may comprise a surface on the exterior or outer edge of the anatomical feature, or an inner surface, such as a ventricle wall in the heart. Generally in embodiments where the image comprises a medical image, the surface of interest may comprise a boundary of a tissue of interest in the medical image.

Although examples herein may be provided with respect to medical images, it will be appreciated that the teachings herein may be applied to other scientific images. For example, the method 100 may be applied to a three dimensional ground penetrating radar (GPR) image. In such an example, the surface of interest may comprise a surface associated with a geological feature, such as a seam in a rock formation or an underground deposit of water or oil.

More generally the teachings herein may be applied to technologies such as virtual reality technologies, whereby a three dimensional image volume is rendered onto a two dimensional display. Such a two dimensional display may comprise, for example, a display in goggles or glasses worn by a user. In such an example, the feature of interest may comprise any feature in the three dimensional image volume, including, but not limited to people, animals, buildings, trees, and/or fictional objects.

Although examples have been provided for the type of three dimensional image volume, a person skilled in the art will appreciate that the teachings provided herein may equally be applied to rendering any other type of three dimensional image volume onto a two dimensional surface (e.g. display).

The two dimensional display may comprise, for example, the display of a screen or display for displaying images to a user. The two dimensional display may therefore be associated with a screen on a desktop, laptop, tablet, mobile phone or a display associated with dedicated equipment such as a medical apparatus. In some embodiments the two dimensional display may be associated with a virtual reality viewing apparatus, such as virtual reality glasses or goggles that may be worn by a user.

Generally, the three dimensional image volume and the two dimensional display comprise a plurality (or set) of image components. For example, the two dimensional display may be comprised of image components comprising pixels. The three dimensional image volume may be comprised of image components comprising voxels. Unless otherwise stated, references herein to "pixel" generally refer to the pixel in the two dimensional surface that is being processed. Unless otherwise stated, references herein to "voxel" generally refer to voxels in the three dimensional volume that lie along the line of sight.

Turning back to the method 100, in block 102 a line of sight may comprise a line (or "ray") starting from the pixel in the two dimensional display that is being processed, passing through the three dimensional volume. The line of sight may be projected (e.g. cast or shot) tangentially (e.g. at an angle of 45 degrees) to the surface of the two dimensional display at the point on the surface of the two dimensional display corresponding to the associated pixel. Alternatively, the line of sight may be projected at an angle to the surface of the two dimensional volume into the three dimensional volume (e.g. to reflect a particular viewing direction into the three dimensional volume).

Stepping through a plurality of points (otherwise known as "ray-marching" or performing a ray-march) may comprise considering each voxel in turn that intersects the line of sight. Alternatively stepping through a plurality of points may comprise determining a sequence of equally spaced points along the line and interpolating a value/color corresponding to the image volume at each point. In this sense the plurality of points may be considered "sampling points" whereby the value/color of the voxels in the region of each of the points is sampled. Interpolation may be used when the points are located between voxels. In some examples, trilinear interpolation may be used.

With respect to block 104, block 104 comprises determining a first point along the line of sight at which the three dimensional volume has a value that satisfies a first criteria indicating that the first point comprises a surface of interest in the three dimensional image.

In some embodiments, the first criteria may comprise a threshold. As such, sequentially stepping through a plurality of points along a line of sight from the pixel into the three dimensional volume may further comprise at each point, comparing the value of the three dimensional volume at the point to a threshold representing a value associated with the surface of interest. At block 104, the method may comprise determining the first point based on the step of comparing.

For example, the first point may comprise the first point in the sequence that has a value at the threshold. This point may be determined using interpolation, for example, a first voxel may be determined having a value above the threshold and interpolation between the first voxel and neighboring voxels along the line of sight may be interpolated in order to determine the location of the first point.

In other words, block 104 may comprise determining, via interpolation of neighbouring voxels in the three dimensional volume, a first point along the line of sight at which the three dimensional volume has a value that satisfies the first criteria indicating that the first point lies on a surface of interest in the three dimensional image.

The skilled person will appreciate that this is an example however, and for example, in an inverse image, or depending on the image characteristics, a surface may be defined as the first point having a value below the threshold.

The threshold may comprise a voxel-value threshold level, indicating a level that a user would like to see rendered. Such a voxel-value threshold may correspond to (or indicate) a density level (in CT, MRI or Ultrasound data). In some embodiments, a voxel-value threshold may correspond to a more complex, compositional value such as a motion vector, tissue characteristic, temperature, or a color/brightness/transparency value depending on the particular volumetric data sets.

As such, in some embodiments, the surface of interest may comprise a physical boundary or physical feature. More generally, the surface of interest may comprise a plurality of voxels having a particular value (e.g. constant value) or characteristic (e.g. a particular motion vector, tissue characteristic, temperature, or a color/brightness/transparency value, as noted above).

In block 106, the method comprises determining a second point that lies normal to (e.g. in a direction normal to) the boundary/surface of interest at the first point.

The second point may lie at a predefined distance in a direction normal to the surface of interest at the first point. As described below, the predefined distance may comprise a distance less than a voxel width in the three dimensional volume.

Block 106 may thus comprise determining a normal vector to the surface of interest at the first point. In some embodiments an inverse normal vector may be used. In embodiments where the three dimensional image comprises a medical image, a normal vector may be determined at the first point on the surface of interest in a direction into a tissue of interest associated with the surface of interest.

Using the normal vector, the block of determining 106 a second point may then comprise determining the second point at a predefined distance from the first point in the direction of the determined normal vector. The predefined distance may comprise a constant value.

As such, in some embodiments, the second point may be determined using the formula $P_2=P_1+c*n$. In this formula $P_2$ comprises the second point (e.g. a vector corresponding to the location of the second point in the three dimensional volume) and $P_1$ comprises the first point (e.g. a vector corresponding to the location of the first point in the three dimensional volume). n is the normal vector and c is a constant.

In some embodiments, the constant c may have a value from about 0.001 to about 0.5. Put another way, the second point may lie less than a voxel width (e.g. between 0.001 to 0.5 of a voxel width) from the first point, in the direction of the normal vector.

In terms of FIG. 2, the second surface 212 may thus be positioned less than a voxel (e.g. between 0.001 to 0.5 of a voxel width) from the surface of interest 210 at all points.

In a particular embodiment, c may have a value of about 0.0025. This has been found by experimentation to effectively render a surface in a medical image whilst providing enough color variation due to characteristics of the tissue just within the rendered surface.

The skilled person will appreciate however that an appropriate value for c may depend on the properties of the three dimensional image and/or the properties of the surface of interest. For example, c may depend on properties such as the resolution of the three dimensional image and/or the thickness of the surface of interest.

Turning back to the method 100, in block 108 the method comprises determining a value for the pixel (e.g. a brightness and/or colour level with which to display the pixel) based on a first value associated with the second point. The first value may comprise, for example, an interpolation of the values of voxels neighbouring the second point in the three dimensional volume. In some embodiments, determining a value for the pixel may comprise using a value/color (e.g. RGB value) of the second point (in the three dimensional volume) as the value for the pixel (on the screen). In some embodiments, determining a value for the pixel may comprise using just or only the value/color (e.g. RGB value) associated with the second point as the value for the pixel. The value at the second point may be determined via interpolation (e.g. of neighbouring voxel values) if the second point lies between voxels (or towards an edge of an individual voxel) in the three dimensional image.

In some embodiments, the value at the second point may be determined by compositing the values/colors of the first point and the second point. In other embodiments the value for the pixel being based on a first value associated with the second point may further comprise determining the value for the pixel based on a lighting or shading profile.

For example, a transfer function may retrieve a Red Green Blue Alpha (RGBA) material color for the second point, via a look-up table. The skilled person will be familiar with the use of lighting and/or shading profiles, for example, the second point may be shaded (e.g. colored and/or lit) according to such a look-up table and/or the location of a light source applied to the three dimensional image volume.

In some example, dependent on whether the second point is derived from an inner or outer surface of a feature in the volume (as determined by the algorithm (i.e. direction of the normal vector)) a different transfer function and/or look-up table may be used.

As noted above, the method 100 has the effect of rendering a surface 216 that is removed from, but traces the surface of interest by a predefined distance (e.g. it may trace the surface of interest at a distance less than a voxel width from the surface of interest).

The method 100 may comprise further steps, for example, the method 100 may comprise ceasing to sequentially step through the plurality of points once the first and/or second points are determined. In other words, once the first and second points are determined, the method may move on to the next pixel in the three dimensional display. In this way the method may provide computational efficiency, for example, over methods where every voxel along each the line of sight (or ray) is considered.

An embodiment of the method 100 as described above is illustrated in FIG. 3. In this embodiment, there is a three dimensional volume of a medical image that is to be displayed on a two dimensional display in the form of a screen or user display. In this embodiment, the surface of interest may comprise either an outer surface of a tissue of interest, e.g. an exterior surface of an anatomical feature in the three dimensional image, or an inner surface of the tissue of interest, e.g. an interior surface of an anatomical feature in the three dimensional image volume. In this embodiment, the first criteria comprises a threshold value that is consistent with a point on the outer or inner surface of a tissue-of-interest (TOI).

Figure 3:
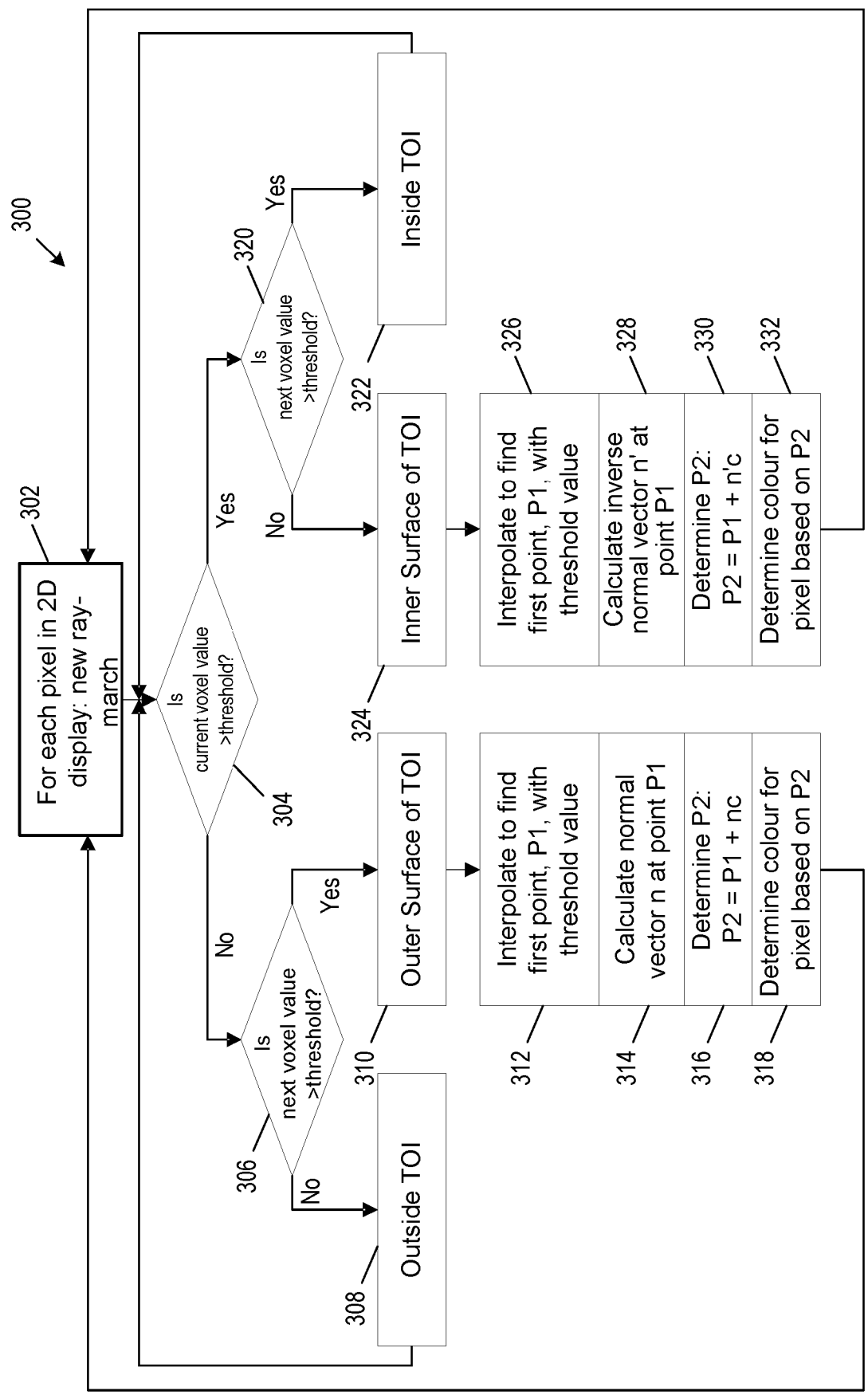
FIG. 3 shows a further method according to some embodiments herein.

FIG. 3 illustrates a flow chart of blocks that are performed, according to this embodiment. For each pixel on the two dimensional display or display, the method starts at block 302. The method is repeated for each pixel, starting at block 302 afresh. In this embodiment, block 102 of method 100 (e.g. the block of sequentially stepping 102 through a plurality of points along a line of sight from the pixel into the three dimensional volume) comprises at 304, determining whether the voxel closest to the pixel in the two dimensional display (e.g. the "starting voxel" lying at the start of the ray) is greater than the threshold value. In this embodiment, if the starting voxel is greater than the threshold then this indicates that the edge of the image lies within the tissue of interest. If the starting voxel is less than the threshold then the edge of the image lies exterior to the tissue of interest.

If the value at the starting voxel is not greater than the threshold, then the method moves on at block 306 to the next voxel along the line of sight to determine whether the value of the next voxel is above the threshold. If the next voxel is not greater than the threshold, then the voxels being considered lie outside 308 the tissue of interest. Voxels along the line of sight are compared to the threshold according to loop 304, 306, 308 until a first voxel $V_1$ is determined along the line of sight at which the three dimensional volume has a value that is above the threshold and thus satisfies the first criteria indicating that the first voxel lies on the outer surface of the tissue of interest 310.

In block 312, interpolation is used along the line of sight around $V_1$ in order to find a first point, P1, along the line of sight that has a value corresponding to the threshold value.

From this first point P1, a normal vector, n, is calculated 314, normal to the outer surface of the tissue of interest at the point P1, and a second point, P2, is determined 106, 316 that lies normal to the surface of interest at the first point. In this embodiment, the location of the second point is determined using the equation $P_2=P_1+c*n$, as described above.

In block 318, the method comprises determining a color or value associated for the pixel, based on a value/color associated with the second point P2. This may be determined by interpolating voxel values/colors either side of the second point P2. It may further comprise using a look-up table as described above.

The method then loops back to block 302 and repeats the steps above for the next pixel in the two dimensional display. The method may then comprise rendering the three dimensional volume on the two dimensional display using the values determined for each pixel in the two dimensional display.

In this way an outer surface of the tissue of interest may be rendered. In this sense an outer surface comprises, for example, the exterior surface of the heart.

Turning back to block 304, if the first voxel along the ray, e.g. the starting voxel were above the threshold value, then this may indicate that the edge of the image lies within the tissue of interest. For completeness it is noted that ordinarily in medical imaging, lower density (lower voxel values) are interpreted as void and higher density value respond to more dense structures, however the skilled person will appreciate that it would also be possible to implement the method on inverted images e.g. with inverted density scales (e.g. inverse images) by inverting the criteria herein.

According to this embodiment, in this circumstance, the method moves to block 320 which comprises determining whether the value of the next voxel along the line of sight is greater than the threshold value.

If the value of the next voxel is greater than the threshold, then the next voxel still lies within the tissue of interest 322 and the method moves on to block 304 to the next voxel along the line of sight to determine whether the value of the next voxel is above the threshold. This continues via loop 304, 320, 322 until a voxel $V_1$ is determined along the line of sight at which the three dimensional volume has a value that is less than the threshold value, indicating that this voxel lies within an inner surface 322 of the tissue of interest.

In block 326, interpolation is used along the line of sight around $V_1$ in order to find a first point, P1, along the line of sight that has a value corresponding to the threshold value.

From this first point P1, an inverted normal vector, n, is calculated 328 and a second point, P2, is determined 106, 330 that lies inversely normal to the surface of interest at the first point. In this embodiment, the location of the second point is determined using the equation $P_2=P_1+c*n'$, as described above, whereby n' comprises the inverted normal vector. The use of the inverted normal vector in this way ensures that (when moving from inside the tissue of interest to an inner boundary) the tissue of interest is rendered e.g. rather than a surface lying within an inner surface of the tissue of interest, such as a cavity within the anatomical feature.

In block 332, the method comprises determining a color or value for the pixel based on a color/value associated with the second point P2. This may be determined by interpolating voxel values/colors either side of the second point P2. It may further comprise using a look-up table as described above.

The method 300 as described above is then repeated for each other pixel in the two dimensional display or display, to build up a two dimensional rendering of the three dimensional surface of interest in the three dimensional medical image volume.

The method 300 as described above is targeted at opaque rendering of the volume: the ray-marching ends as soon as a point is found that should be rendered, e.g. in medical image applications, a point representing an outer or inner surface of a tissue-of-interest (TOI), in which the tissue of interest is determined by the voxel-value threshold value being used. In this way, the method 300 and the embodiments of method 100 described above, provide an efficient use of computing power.

In other embodiments, it is it is also possible to implement semi-transparent rendering of the inner and outer surfaces of the volume, and possibly also the tissue of interest between those surfaces. This method is different to what is described above in that the ray-march does not stop after having found a surface voxel and determining its rendering color. Instead, it continues the Ray-march, to determine, for example, a) the rendering color of outer surfaces of the tissue-of-interest, b) the rendering color of inner surfaces of the tissue-of-interest and/or c) the rendering color of the tissue-of-interest itself. It will be appreciated however, that it is possible to skip the voxels representing the tissue of interest itself, and just render the surfaces.

Such embodiments require ray-marching throughout the full three dimensional volume of an image, however, the pixel value in the two dimensional display may be based on compositing the boundary values (values a-c above) and therefore this may still be more computationally efficient than prior art methods that composite values along the full extent of each ray.

Put more formally, in some embodiments, the method 100 may further comprise: determining a third point along the line of sight at a point at which the three dimensional volume has a value that satisfies a second criteria indicating that the third point comprises/lies on another surface of interest in the image.

In embodiments where the three dimensional image comprises a medical image, the second criteria may be related to another surface associated with a tissue of interest, or anatomical feature of interest in the image. For example, an inner/interior, outer/exterior surface or another structure within the tissue of interest. As noted above with respect to the first criteria, in some embodiments the second criteria may comprise a voxel-value threshold level, indicating a level that a user would like to see rendered. Such a voxel-value threshold may correspond to (or indicate) a density level (in CT, MRI or Ultrasound data). In some embodiments, a voxel-value threshold may correspond to a more complex, compositional value such as a motion vector, tissue characteristic, temperature, or a color/brightness/transparency value depending on the particular volumetric data sets.

The third point may be found by interpolation of neighbouring voxel values as was described above for the first point.

Having determined the third point, from the third point, the method 100 may further comprise determining a fourth point that lies normal to the other surface of interest at the third point. The fourth point may lie at a predefined distance in a direction normal to the surface of interest at the third point. The predefined distance may comprise a distance less than a voxel width in the three dimensional volume.

The method may thus comprise determining a normal vector or inverted normal vector to the other surface of interest at the third point. The fourth point may lie at a predefined distance from the third point in the direction of the determined normal vector. In some embodiments, the fourth point may be determined using the formula $P_4=P_3$ c*n. This formula was explained above with respect to the determination of the first and second points and the detail therein will be understood to apply equally here.

To summarize, the third point comprises a point on (e.g. that lies on) another (e.g. second) surface of interest in the three dimensional image. And the fourth point lies tangential, or normal to the other surface of interest. As noted above, in some embodiments the surface of interest comprises an outer surface of a feature of interest and the other surface of interest (e.g. second surface of interest) comprises an inner surface of the feature of interest.

With respect to block 108 of method 100, in embodiments where a fourth point is determined as above, determining 108 a value for the pixel may further be based on a second value associated with the fourth point. For example, determining 108 a value for the pixel may be based on the first value associated with the second point (as described above) and the second value associated with the fourth point. The block of determining 108 may be based on only (or just) the first and second values. For example, the first value associated with the second point (as described above) and the second value associated with the fourth point may be composited.

The second value associated with the fourth point may be determined, for example, by interpolating values of neighbouring voxels, as was described above with respect to the first value associated with the second point.

Put another way, the value/color for the associated pixel in the two dimensional display in each ray-march may be set based on the colors/values of points lying (e.g. fractionally or less than a voxel width) tangential to the surface(s) intersected by the line of sight of the ray associated with the ray-march.

As noted above, the first value associated with the second point may be determined based on a first look up table. The second value associated with the fourth point may be determined based on a second look up table. The first look up table may be different to the second look up table. If the first and second look up tables are used for lighting/shading, then using different look up tables to shade the second and fourth points may allow different shading regimes to be implemented for different types of surfaces, e.g. inner and outer surfaces, for example.

The first and second values may be allocated a transparency value. In such examples, voxel colors and transparencies within one ray need to be composited in the order of sight, to determine the final rendering color of the associated pixel in the two dimensional display.

It will be appreciated that third and/or subsequent criteria may be used to pick out further surfaces or features in the three dimensional volume of the image and that block 108 may further comprise determining 108 a value for the associated pixel in the two dimensional surface based on a value(s) associated with the further surfaces or features.

Figure 4:
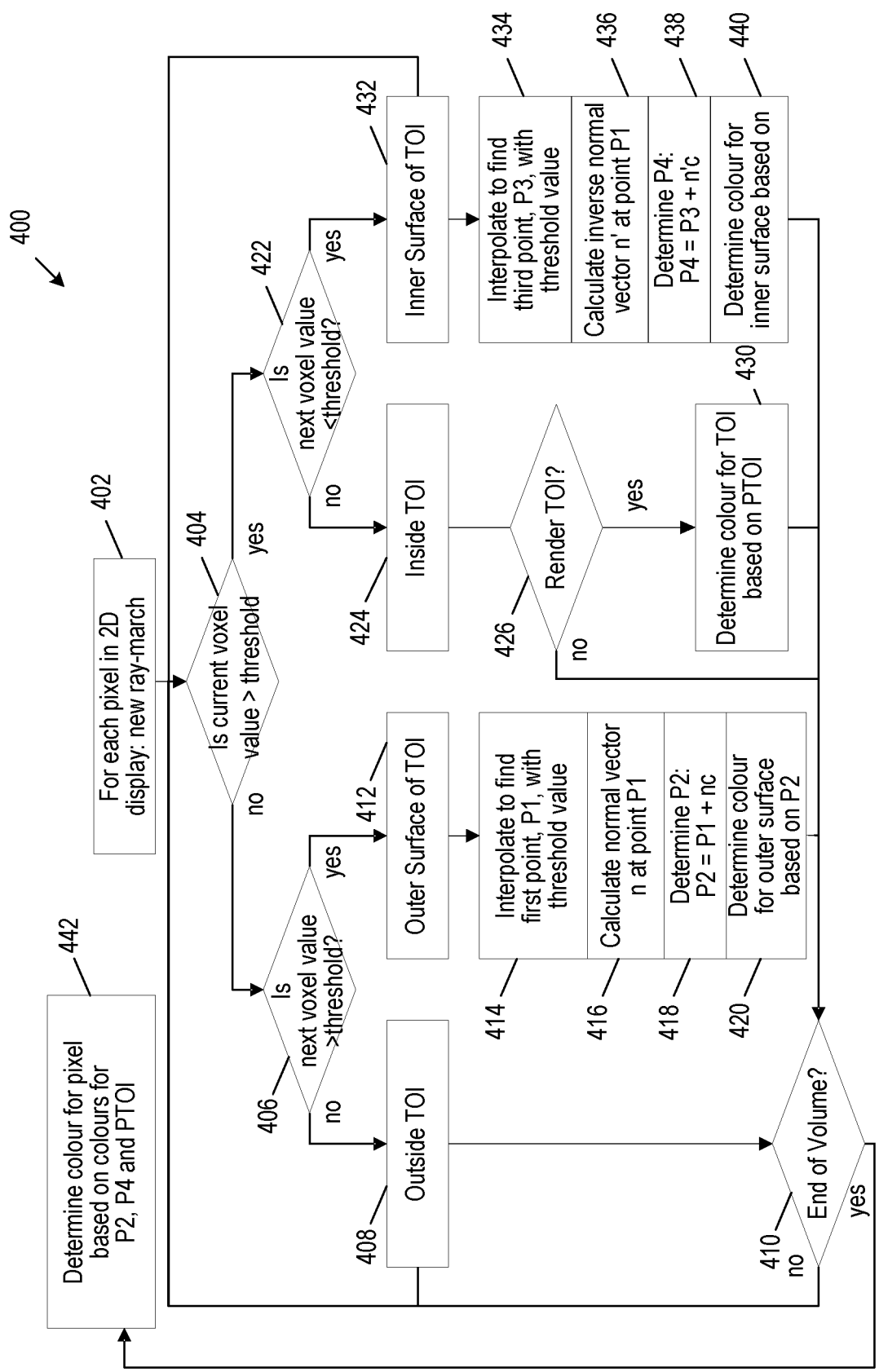
FIG. 4 shows a further method according to some embodiments herein.

FIG. 4 shows a method 400 according to some embodiments herein. In this embodiment, there is a three dimensional volume of a medical image. In this embodiment, voxels comprised in any outer, inner and/or internal portions of a surface of interest are to be composited along each line of sight.

In this embodiment, the first criteria comprises a threshold value that is consistent with a point on an outer and/or inner surface of a tissue-of-interest.

FIG. 4 illustrates a flow chart of blocks that are performed, according to this embodiment. For each pixel on the two dimensional display the method starts at block 402. The method is repeated for each pixel, starting at block 402 afresh. In this embodiment, block 102 of method 100 (e.g. the block of sequentially stepping 102 through a plurality of points along a line of sight from the pixel into the three dimensional volume) comprises at 404, determining whether the voxel closest to the pixel in the two dimensional display (e.g. the "starting voxel" lying at the start of the ray) is greater than the threshold value. As in the method 300, in this embodiment, if the starting voxel is greater than the threshold then this indicates that the edge of the image lies within the tissue of interest. If the starting voxel is less than the threshold then the edge of the image lies exterior to the tissue of interest.

If the starting voxel value is not greater than the threshold then the method moves to block 406 which asks whether the next voxel along the line of sight is greater than the threshold. If the next voxel is not above the threshold then we are outside the tissue of interest 408 and unless the end of the volume is reached 410, the method 400 loops back to block 404.

Voxels along the line of sight are thus compared to the threshold according to loop 404, 406, 408, 410 until a first voxel $V_1$ is determined along the line of sight at which the three dimensional volume has a value that is above the threshold and thus satisfies the first criteria indicating that the first voxel lies on the outer surface of the tissue of interest 412.

In block 414, interpolation is used along the line of sight around $V_1$ in order to find a first point, P1, along the line of sight that has a value corresponding to the threshold value.

From this first point P1, a normal vector, n, is calculated 416, normal to the outer surface of the tissue of interest at the point P1, and a second point, P2, is determined 106, 418 that lies normal to the surface of interest at the first point. In this embodiment, the location of the second point is determined using the equation $P_2=P_1+c*n$, as described above.

In block 420, the method comprises determining a color or value associated with the second point P2. This may be determined by interpolating voxel values/colors either side of the second point P2. It may further comprise using a look-up table as described above. The method then moves to block 410 which comprises determining whether the end of the three dimensional volume has been reached. If not, then the method loops back to block 404 and the next voxel in the line of sight is compared to the threshold (e.g. the ray-march continues).

If at block 404 a voxel is found having a value above the threshold, then the method moves to block 422 which comprises determining whether the next voxel along the line of sight has a value that is less than the threshold (e.g. a transition from inside the tissue of interest to outside it). If the next voxel is not below the threshold then the current position of the ray-march is within the tissue of interest 424. The method then moves to block 426 where it is determined whether to render the tissue of interest. This information may be contained, for example, in a configuration file, or user input or similar.

If it is determined that the tissue of interest is not to be rendered, then the method moves to block 410 and if the end of the volume has not yet been reached, then the method loops back to block 404 as previously described.

If in block 426 it is determined that the tissue of interest should be rendered, then in block 428, the method comprises determining a value associated with a point lying within the tissue of interest $P_{TOI}$. The method then moves to block 410 and if the end of the volume has not yet been reached, then the method loops back to block 404 as previously described.

If at block 422 the next voxel in the ray march, voxel $V_3$, lies below the threshold (e.g. a transition is found where two voxels along the line of sight go from being above the threshold to below it) then this implies that the line of sight has exited the tissue of interest and thus an inner surface has been detected 432.

In block 434, interpolation is used along the line of sight around $V_3$ in order to find a third point, P3, along the line of sight that has a value corresponding to the threshold value.

From this third point P3, an inverse normal vector, n', is calculated 436, inversely normal to the outer surface of the tissue of interest at the point P3, and a fourth point, P4, is determined 106, 438 that lies normal to the surface of interest at the first point. In this embodiment, the location of the fourth point is determined using the equation $P_4=P_3+c*n'$, as described above.

In block 440, the method comprises determining a color or value associated with the fourth point P4. This may be determined by interpolating voxel values/colors either side of the fourth point P4. It may further comprise using a look-up table as described above.

The method then moves to block 410 which comprises determining whether the end of the three dimensional volume has been reached. If the end of the volume has not been reached, then the method loops back to block 404.

If at block 410, the end of the volume has been reached, then the method moves to block 438 whereby the values associated with the points P2, P4 and $P_{TOI}$ are composited (taking any shading/lighting profiles into account) to determine the value/color for the pixel in the two dimensional display associated with this ray-march.

The skilled person will appreciate that this is an example only and that more than one outer surface, more than one inner surface and/or more than one portion of the tissue of interest may be sampled and composited according to the scheme set out in FIG. 4.

The results of the methods herein are thus characterized by the following visual features: 1) In traditional volume rendering all voxels are rendered, in methods herein they are not 2) Voxels representing the surfaces are rendered 3) Voxels representing the tissue of interest may be rendered 4) Voxels that do not represent the tissue of interest are not rendered 4) Different renderings (in color and/or transparency) of outer surfaces, inner surfaces, and possibly also the tissue of interest itself may be used. This holds for semi-transparent renderings as well as opaque renderings. In the latter case the use of a cut plane tool may reveal different colors for the surfaces and/or tissue of interest.

Figure 5:
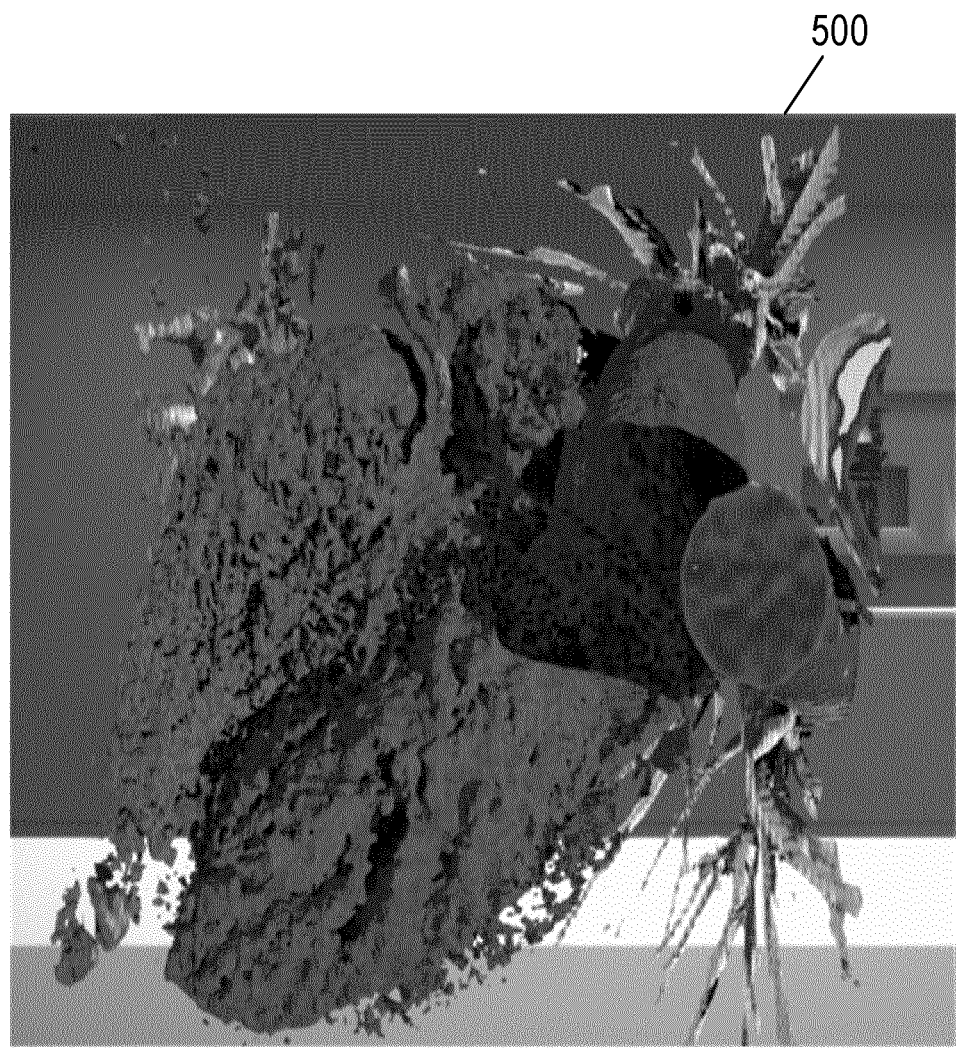
FIG. 5 shows an output of some embodiments herein.

An example of an output of the method 400 is illustrated in FIG. 5 which shows a two dimensional rendering of three dimensional lung 500.

Figure 6:
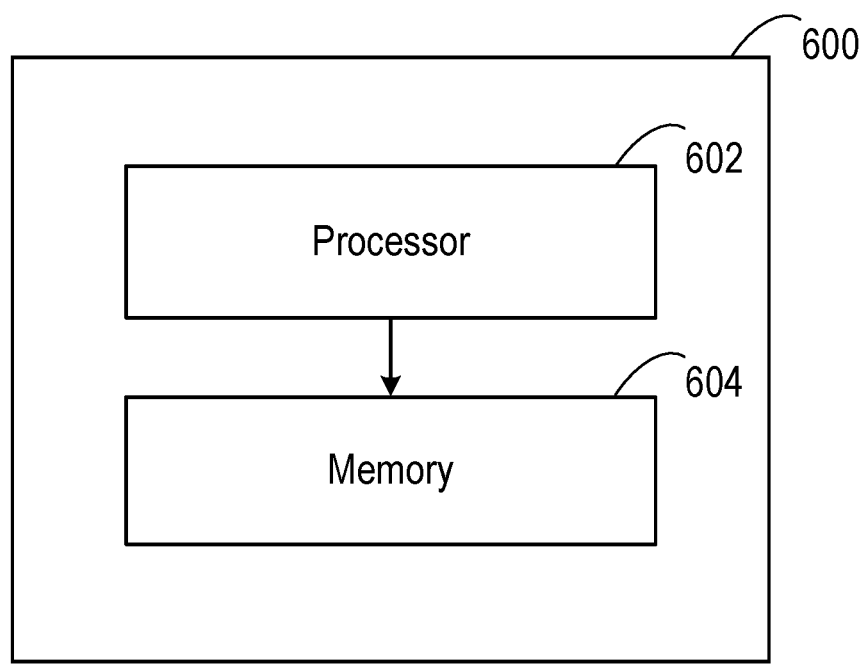
FIG. 6 shows a system according to some embodiments herein.

Turning now to FIG. 6 in some embodiments there is a system 600 for displaying a three dimensional volume of an image on a two dimensional display. The system may form part of specialized equipment, such as specialized medical equipment, alternatively, the system may form part of a computer system e.g. such as a laptop, desktop computer or other device, or the system 600 may form part of the cloud/a distributed computing arrangement.

The system comprises a memory 604 comprising instruction data representing a set of instructions and a processor 602 configured to communicate with the memory and to execute the set of instructions. Generally, the set of instructions, when executed by the processor, may cause the processor to perform any of the embodiments of the methods 100, 300 or 400 as described above. In some implementations, the set of instructions can comprise a plurality of software and/or hardware modules that are each configured to perform, or are for performing, individual or multiple steps of the method described herein.

More specifically, the set of instructions, when executed by the processor, cause the processor to, for each pixel in the two dimensional display: sequentially step through a plurality of points along a line of sight from the pixel into the three dimensional volume, determine a first point along the line of sight at which the three dimensional volume has a value that satisfies a first criteria indicating that the first point comprises a surface of interest in the three dimensional image, from the first point, determine a second point that lies normal to the surface of interest at the first point, and determine a value for the pixel based on a first value associated with the second point.

Sequentially stepping through a plurality of points along a line of sight from the pixel into the three dimensional volume was described in detail with respect to block 102 of the method 100 (and also with respect to methods 300 and 400) and the detail therein will be understood to apply equally to the configuration of the processor 602. Determining a first point along the line of sight at which the three dimensional volume has a value that satisfies a first criteria indicating that the first point comprises a surface of interest in the three dimensional image was described in detail with respect to block 104 of the method 100 (and also with respect to methods 300 and 400) and the detail therein will be understood to apply equally to the configuration of the processor 102. From the first point, determining a second point that lies normal to the surface of interest at the first point, and determining a value for the pixel based on a first value associated with the second point were described in detail with respect to blocks 106 and 108 respectively of the method 100 (and also with respect to methods 300 and 400) and the detail therein will be understood to apply equally to the configuration of the processor 602.

The processor 602 can comprise one or more processors, processing units, multi-core processors or modules that are configured or programmed to control the system 600 in the manner described herein. In particular implementations, the processor 602 can comprise a plurality of software and/or hardware modules that are each configured to perform, or are for performing, individual or multiple steps of the method described herein. The processor 602 can comprise one or more processors, processing units, multi-core processors and/or modules that are configured or programmed to control the system 600 in the manner described herein. In some implementations, for example, the processor 602 may comprise a plurality of (for example, interoperated) processors, processing units, multi-core processors and/or modules configured for distributed processing. It will be appreciated by a person skilled in the art that such processors, processing units, multi-core processors and/or modules may be located in different locations and may perform different steps and/or different parts of a single step of the method described herein.

The memory 604 is configured to store program code that can be executed by the processor 102 to perform the method described herein. Alternatively or in addition, one or more memories 604 may be external to (i.e. separate to or remote from) the system 600. For example, one or more memories 604 may be part of another device. Memory 604 can be used to store images, information and/or data received, calculated or determined by the processor 602 of the apparatus 600 or from any interfaces, memories or devices that are external to the system 600. The processor 602 may be configured to control the memory 604 to store the images, information, data, signals and measurements.

In some embodiments, the memory 604 may comprise a plurality of sub-memories, each sub-memory being capable of storing a piece of instruction data. For example, at least one sub-memory may store instruction data representing at least one instruction of the set of instructions, while at least one other sub-memory may store instruction data representing at least one other instruction of the set of instructions.

In some embodiments, the system 600 may comprise a two dimensional display for displaying/rendering the two dimensional version of the three dimensional image. In some embodiments, therefore, references to pixels refer to the pixels of a display forming part of the system 600. The display may comprise, for example, a computer screen, a screen on a mobile phone or tablet, a screen forming part of a medical equipment or medical diagnostic tool, a screen forming part of goggles or a visor associated with a virtual reality display, or any other display capable of displaying a two dimensional rendering or projection of a three dimensional volume of an image.

The system may further comprise a user input, such as a keyboard, mouse or other input device that enables a user to interact with the system, for example, to provide initial input parameters to be used in the method described herein.

It will be appreciated that FIG. 6 only shows the components required to illustrate this aspect of the disclosure and, in a practical implementation, the system 600 may comprise additional components to those shown. For example, the system 600 may comprise a battery or other power supply for powering the system 600 or means for connecting the system 600 to a mains power supply.

In another embodiment, there is provided a computer program product comprising a computer readable medium, the computer readable medium having computer readable code embodied therein, the computer readable code being configured such that, on execution by a suitable computer or processor, the computer or processor is caused to perform the method or methods described herein. Thus, it will be appreciated that the disclosure also applies to computer programs, particularly computer programs on or in a carrier, adapted to put embodiments into practice. The program may be in the form of a source code, an object code, a code intermediate source and an object code such as in a partially compiled form, or in any other form suitable for use in the implementation of the method according to the embodiments described herein.

It will also be appreciated that such a program may have many different architectural designs. For example, a program code implementing the functionality of the method or system may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other.

The carrier of a computer program may be any entity or device capable of carrying the program. For example, the carrier may include a data storage, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of displaying a three dimensional volume of an image on a two dimensional display, wherein for each pixel in the two dimensional display, the method comprises:
    sequentially stepping through a plurality of points along a line of sight from the pixel into the three dimensional volume;
    determining a first point along the line of sight at which the three dimensional volume has a value that satisfies a first criteria indicating that the first point lies on a surface of interest in the three dimensional image;
    from the first point, determining a second point that lies at a predefined distance in a direction normal to the surface of interest at the first point wherein the predefined distance comprises a distance less than a voxel width in the three dimensional volume; and
    determining a value for the pixel based on a first value associated with the second point.

2. A method as in claim 1 wherein the method further comprises determining a normal vector to the surface of interest at the first point; and
    wherein determining a second point comprises:
    determining the second point at the predefined distance from the first point in the direction of the determined normal vector.

3. A method as in claim 2 wherein the second point is determined using the formula:

$$P_2 = P_1 c^* n;$$

wherein $P_2$ is the second point, $P_1$ is the first point, n is the normal vector and c is a constant; and
    wherein the constant c has a value from about 0.001 to about 0.5.

4. A method as in claim 3 wherein c has a value of about 0.0025.

5. A method as in claim 1 wherein sequentially stepping through a plurality of points along a line of sight from the pixel into the three dimensional volume further comprises:
    at each point, comparing the value of the three dimensional volume at the point to a threshold representing a value associated with the surface of interest; and
    determining the first point based on the comparing.

6. A method as in claim 1 wherein the method further comprises:
    ceasing to sequentially step through the plurality of points once the first and/or second points are determined.

7. A method as in claim 1 further comprising:
    determining a third point along the line of sight at a point at which the three dimensional volume has a value that satisfies a second criteria indicating that the third point lies on another surface of interest in the image;
    from the third point, determining a fourth point, that lies normal to the other surface of interest at the third point; and
    wherein determining a value for the pixel is further based on a second value associated with the fourth point.

8. A method as in claim 7 wherein determining a value for the pixel comprises compositing the first and second values.

9. A method as in claim 7 wherein the first value associated with the second point is determined based on a first look up table and wherein the second value associated with the fourth point is determined based on a second look up table that is different to the first look up table.

10. A method as in claim 7 wherein the surface of interest comprises an outer surface of a feature of interest and the other surface of interest comprises an inner surface of the feature of interest.

11. A method as in claim 1 wherein the image comprises a medical image and the surface of interest comprises boundary of a tissue of interest.

12. A method as in claim 1 wherein determining a value for the pixel based on a first value associated with the second point further comprises:
    determining the value for the pixel based on a lighting or shading profile.

13. A method as in claim 1 wherein the first criteria relates to a threshold density, threshold velocity, threshold temperature, threshold brightness, or a threshold color value.

14. A system for displaying a three dimensional volume of an image on a two dimensional display, the system comprising:
    a memory comprising instruction data representing a set of instructions; and
    a processor configured to communicate with the memory and to execute the set of instructions, wherein the set of instructions, when executed by the processor, cause the processor to, for each pixel in the two dimensional display:
    sequentially step through a plurality of points along a line of sight from the pixel into the three dimensional volume;
    determine a first point along the line of sight at which the three dimensional volume has a value that satisfies a first criteria indicating that the first point lies on a surface of interest in the three dimensional image;
    from the first point, determine a second point that lies at a predefined distance in a direction normal to the surface of interest at the first point wherein the predefined distance comprises a distance less than a voxel width in the three dimensional volume; and
    determine a value for the pixel based on a first value associated with the second point.

15. A non-transitory computer readable medium having computer readable code embodied therein, the computer readable code being configured such that, on execution by a suitable computer or processor, the computer or processor is caused, for each pixel in a two dimensional display, to:
    sequentially step through a plurality of points along a line of sight from the pixel into the three dimensional volume;
    determine a first point along the line of sight at which the three dimensional volume has a value that satisfies a first criteria indicating that the first point lies on a surface of interest in the three dimensional image;
    from the first point, determine a second point that lies at a predefined distance in a direction normal to the surface of interest at the first point wherein the predefined distance comprises a distance less than a voxel width in the three dimensional volume; and
    determine a value for the pixel based on a first value associated with the second point.

16. The non-transitory computer readable medium of claim 15, wherein the computer readable code is configured such that, on execution by the suitable computer or processor, the computer or processor is caused to determine a normal vector to the surface of interest at the first point; and determines the second point at the predefined distance from the first point in the direction of the determined normal vector.

17. The non-transitory computer readable medium of claim 15, wherein the computer readable code is configured such that, on execution by the suitable computer or processor, the computer or processor is caused to sequentially step through a plurality of points along a line of sight from the pixel into the three dimensional volume by:

at each point, comparing the value of the three dimensional volume at the point to a threshold representing a value associated with the surface of interest;

and determining the first point based on the comparing.

18. The non-transitory computer readable medium of claim 15, wherein the computer readable code is configured such that, on execution by the suitable computer or processor, the computer or processor is caused to:

determine a third point along the line of sight at a point at which the three dimensional volume has a value that satisfies a second criteria indicating that the third point lies on another surface of interest in the image;

from the third point, determine a fourth point, that lies normal to the other surface of interest at the third point; and determine a value for the pixel based on a second value associated with the fourth point.

19. The non-transitory computer readable medium of claim 18, wherein the value for the pixel comprises a compositing of the first and second values.

20. The non-transitory computer readable medium of claim 15, wherein the first criteria relates to a threshold density, threshold velocity, threshold temperature, threshold brightness, or a threshold color value.

* * * * *